(12) United States Patent
Desai et al.

(10) Patent No.: US 9,151,950 B2
(45) Date of Patent: Oct. 6, 2015

(54) LID DESIGN TO SEAL OPTICAL COMPONENTS OF A TRANSCEIVER MODULE

(71) Applicant: Cisco Technology, Inc., San Jose, CA (US)

(72) Inventors: Kishor V. Desai, Fremont, CA (US); Ravinder Kachru, San Jose, CA (US); Soham R. Pathak, Allentown, PA (US); Utpal Kumar Chakrabarti, Allentown, PA (US)

(73) Assignee: Cisco Technology, Inc., San Jose, CA (US)

( * ) Notice: Subject to any disclaimer, the term of this patent is extended or adjusted under 35 U.S.C. 154(b) by 354 days.

(21) Appl. No.: 13/678,915

(22) Filed: Nov. 16, 2012

(65) Prior Publication Data
US 2014/0043685 A1     Feb. 13, 2014

Related U.S. Application Data

(60) Provisional application No. 61/680,330, filed on Aug. 7, 2012.

(51) Int. Cl.
*G02B 7/18* (2006.01)
*G02B 27/00* (2006.01)
*G02B 6/42* (2006.01)

(52) U.S. Cl.
CPC .......... *G02B 27/0006* (2013.01); *G02B 6/4257* (2013.01); *Y10T 156/10* (2015.01)

(58) Field of Classification Search
CPC ...... G02B 27/0006; G02B 7/28; G02B 23/16; G02B 5/124
USPC .................................................. 359/513, 514
See application file for complete search history.

(56) References Cited

U.S. PATENT DOCUMENTS

| 7,253,397 B2 * | 8/2007 | Kirby ............................ 250/239 |
| 2012/0032693 A1 | 2/2012 | Xue et al. |
| 2012/0074557 A1 | 3/2012 | Ahmad et al. |

* cited by examiner

*Primary Examiner* — Euncha Cherry
(74) *Attorney, Agent, or Firm* — Edell, Shapiro & Finnan, LLC

(57) ABSTRACT

Techniques and configurations are provided for packaging optoelectronic devices. In particular, a lid component of an optoelectronic device is provided, and the lid component is configured to cover active components of the optoelectronic device. An optically transparent wall is also provided. The optically transparent wall is coated with an anti-reflective material and configured to interface with a section of the lid component. The optically transparent wall is joined with the section of the lid component such that the optically transparent wall and the lid provide a seal for the active components of the optoelectronic device. Additionally, the lid component has a top surface and a plurality of side surfaces that are coupled to the top surface. An optically transparent wall coated with an anti-reflective material adhesively joins to the top surface and one or more side surfaces.

20 Claims, 7 Drawing Sheets

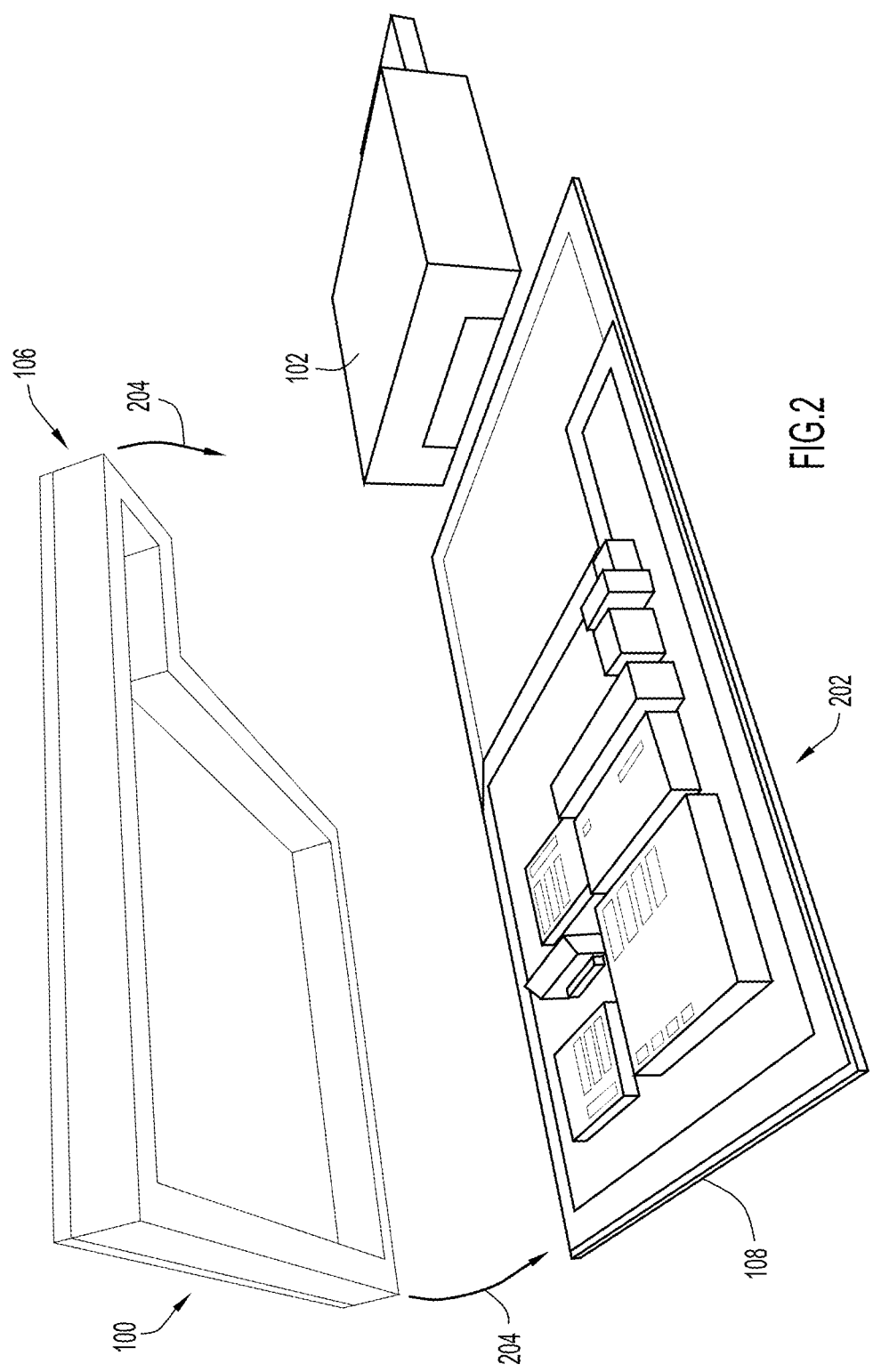

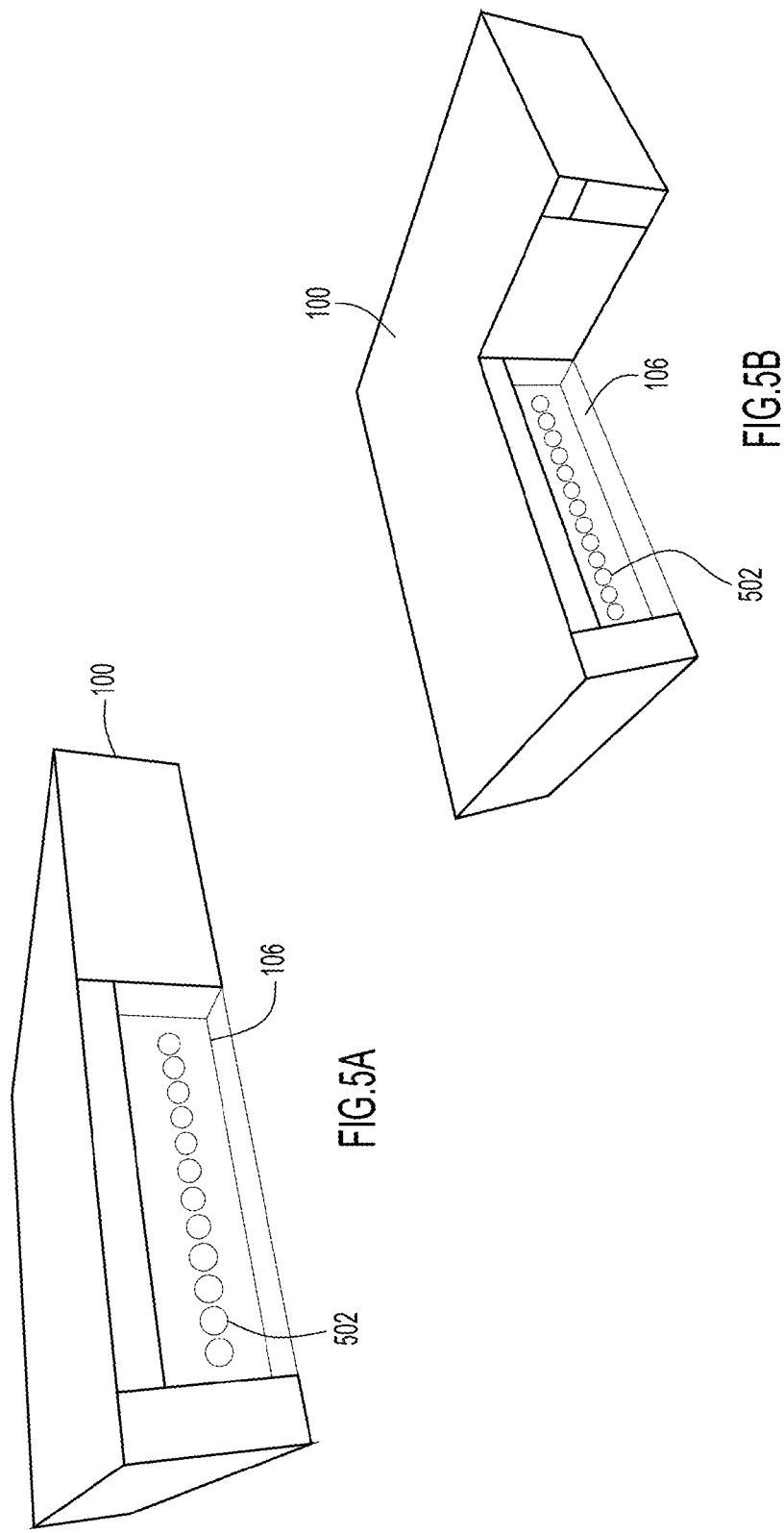

LID DESIGN TO SEAL OPTICAL COMPONENTS OF A TRANSCEIVER MODULE

RELATED APPLICATIONS

This application claims priority to U.S. Provisional Application No. 61/680,330, filed Aug. 7, 2012, the entirety of which is incorporated herein by reference in its entirety.

TECHNICAL FIELD

The present disclosure relates generally to packaging of optoelectronic devices.

BACKGROUND

Precise techniques are used for fabrication and assembly of optoelectronic devices. In particular, optoelectronic devices typically require high precision processing in order to ensure optical linking between a laser diode source to a waveguide and to a connector unit. Optical linking may also be needed from the connector unit to a photodiode. Packaging of optoelectronic devices can be an inhibitor to innovation and cost reduction for optoelectronic transceiver modules.

BRIEF DESCRIPTION OF THE DRAWINGS

FIG. 2 shows an example of the lid design and optically transparent wall in an open configuration, wherein the lid and optically transparent wall are configured to seal or cover active components of an optoelectronic device.

FIGS. 5A and 5B show examples of the lid design and a multiple lens optically transparent wall.

DESCRIPTION OF EXAMPLE EMBODIMENTS

Overview

Techniques and configurations are provided herein for packaging optoelectronic devices. In particular, a lid component of an optoelectronic device is provided, and the lid component is configured to cover active components of the optoelectronic device. An optically transparent wall is also provided. The optically transparent wall is coated with an anti-reflective material and configured to interface with a section of the lid component. The optically transparent wall is joined with the section of the lid component.

Additionally, the lid component has a top surface and plurality of side surfaces that are coupled to the top surface. An optically transparent wall coated with an anti-reflective material adhesively joins to the top surface and one or more side surfaces.

Example Embodiments

Figure 1A:
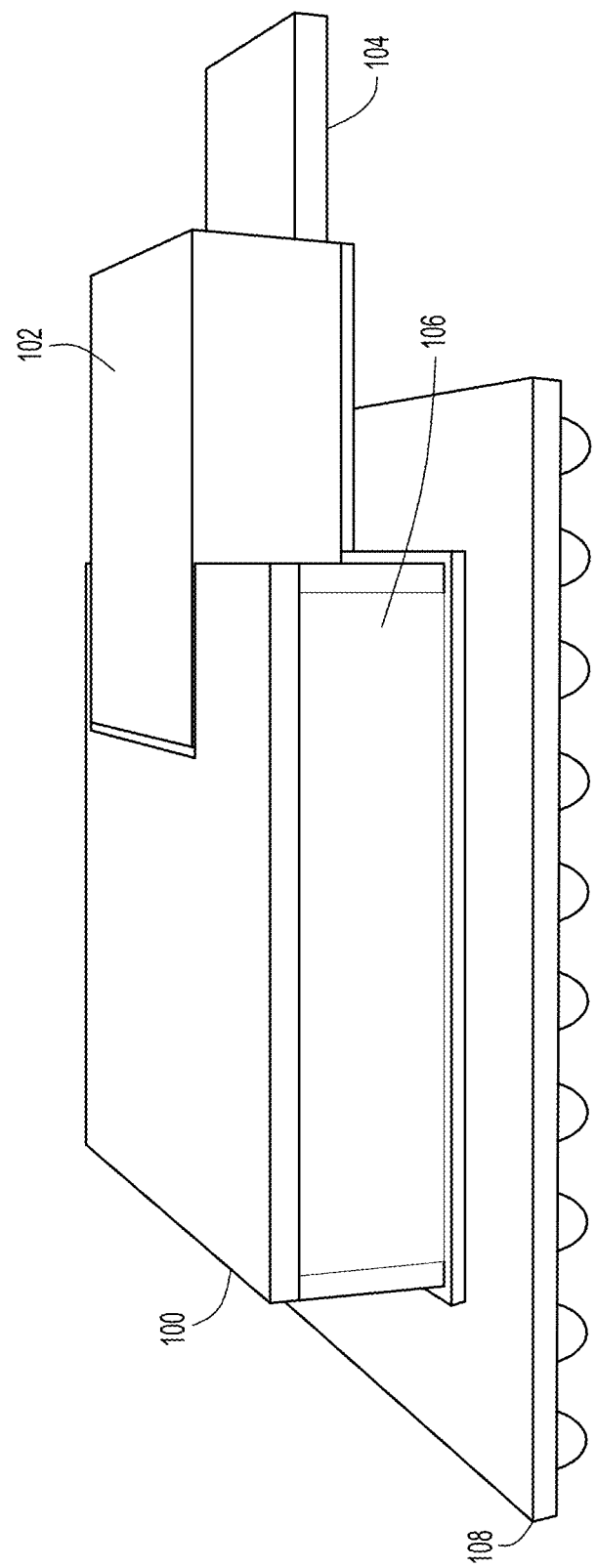
FIGS. 1A-1C show examples of a lid design and optically transparent wall of an optoelectronic device.
Figure 1B:
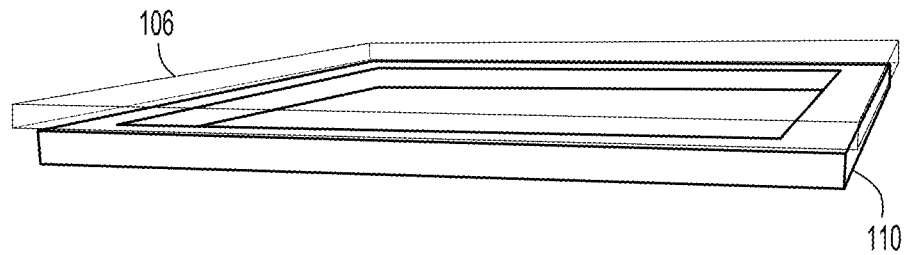
Figure 1C:
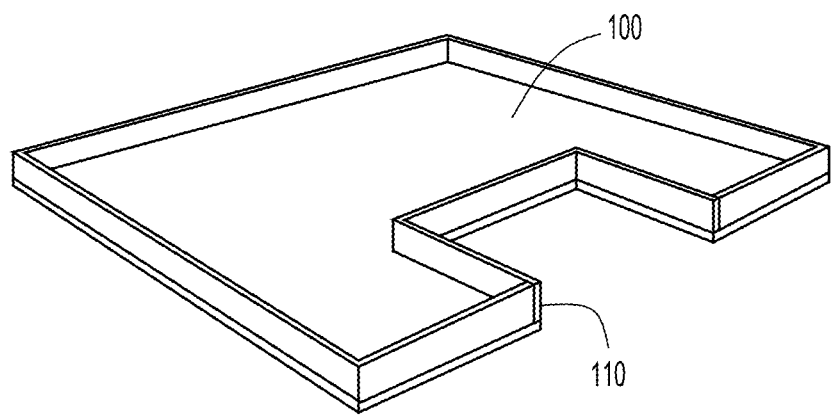

A lid design is presented herein for use in packaging optoelectronic devices. Reference is first made to FIGS. 1A-1C. FIGS. 1A-1C show examples of a lid design with an optically transparent wall. In particular, FIG. 1A shows a lid 100 together with a fiber connector 102. The fiber connector is connected to a ribbon fiber 104. The lid 100 and the fiber connector 102 cover (seal) active components of an optoelectronic device (not shown in FIGS. 1A-1C). The lid 100 also has an optically transparent wall (e.g., glass wall) 106 that, for example, resides in a frame of the lid 100, as described herein. The optoelectronic device may be disposed on an organic substrate ("substrate") shown at reference numeral 108 in FIG. 1A. In one example, the lid 100 has a metallized top surface and a plurality of metallized side surfaces coupled to the top surface. The optically transparent wall 106 may be adhesively joined to the top surface and one or more of the side surfaces.

The lid 100 may be made of one or more suitable materials. For example, the lid may be made of plastic, glass, a metal or a hybrid of plastic and metal. The optically transparent wall 106 may be coated with an anti-reflective (AR) material. The AR coated optically transparent wall 106 allows for a proper optical link between active components of the optoelectronic device and the fiber array connector 102.

The lid 100 may be manufactured using a deep reactive ion etching (DRIE) process. The lid 100 may be manufactured separately from the optically transparent wall 106, and the lid 100 and the optically transparent wall 106 may be adhesively joined after each component has been separately manufactured. For example, the lid 100 and the optically transparent wall 106 may be fabricated using a multiphase process. First, most of the components of the lid 100 may be fabricated, except for a flat wall (the wall 106) that is utilized to seal or cap the lid 100 over the optoelectronic components. When the lid 100 is sealed over the optoelectronic components, the environmental impact on these components (e.g., due to humidity, dust, etc.) is mitigated. The optically transparent wall 106 is independently fabricated, and it is attached to the inside of the lid 100. For example, a metallized (e.g., AlSiC) or glass coated frame (e.g., with Ti/W/Cu/Au—Sn) is provided that seals the optical components and adhesively joins and secures the optically transparent wall 106 to the lid 100. In another example, the optically transparent wall 106 may be attached to the lid 100 using a side-to-side bonding technique.

Reference is now made to FIG. 1B. FIG. 1B shows the optically transparent wall 106 that is adhesively joined to a frame 110 of the lid 100. The frame 110 (also referred to as a "skeleton") may be molded or machined in a wafer form. The frame 110 may have a foot or bond area with a proper metallization to allow a foot surface to be bonded on top of a silicon interposer (e.g., with metallurgy). In parallel, the optically transparent wall 106 (e.g., an AR coated optically transparent wall) is bonded to the inside opening of the frame 110, thus resulting in a hybrid lid. The bonding of the optically transparent wall 106 can be performed using adhesives, glass frit or metallurgical bonding material. This approach allows for a combination of an injection molding or DRIE process to manufacture the frame 110. FIG. 1C shows the lid 100 with the frame 110 that adhesively joins with the optically transparent wall 106.

Reference is now made to FIG. 2. FIG. 2 shows active components 202 of an optoelectronic device mounted on substrate 108, e.g., an interposer. The lid 100 is shown in an unassembled form in which the lid is not covering the active components 202 of an optoelectronic device. When assembled, the lid 100 rests on top of the substrate 108 to ensure a hermetic sealing of the active components 202 of an optoelectronic device and transceiver module. Arrows 204 in FIG. 2 show the placement of the lid 100 over an optoelectronic device. FIG. 2 also shows the optically transparent wall 106 that interfaces with the fiber connector 102 when the lid 100 is mounted. The optically transparent wall 106 allows for an optical link to exist between the active components 202 and the fiber connector 102. In one example, the optically transparent wall 106 is fabricated with the AR material that is transparent for optical links of the active components of the optoelectronic device.

Figure 3A:
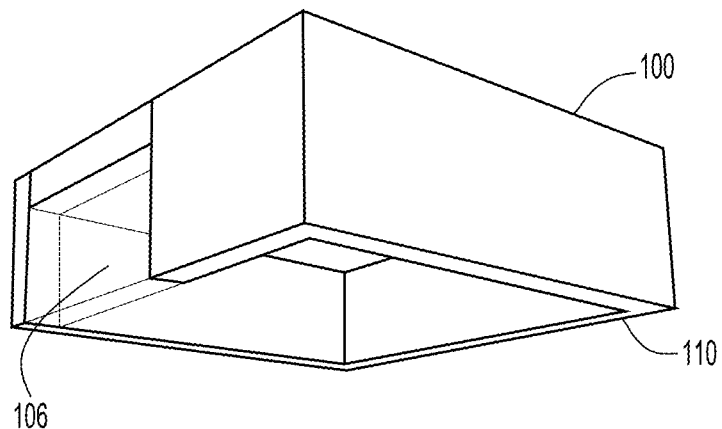
FIGS. 3A-3D show examples of the lid design and optically transparent wall at multiple perspectives.
Figure 3B:
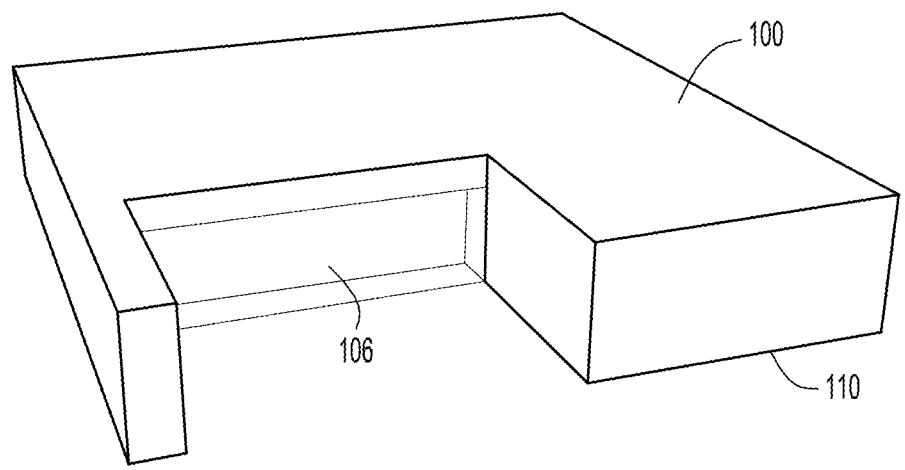
Figure 3C:
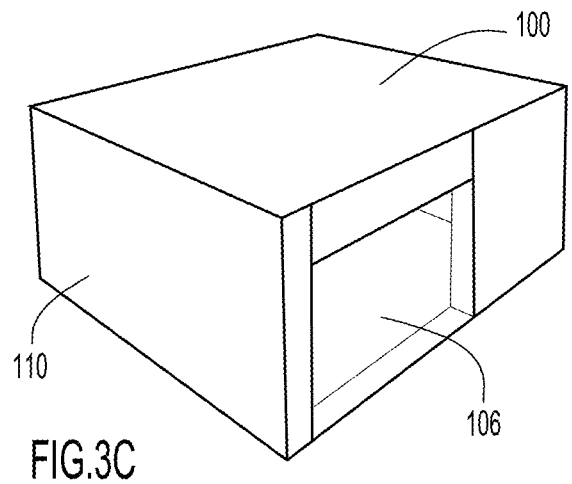
Figure 3D:
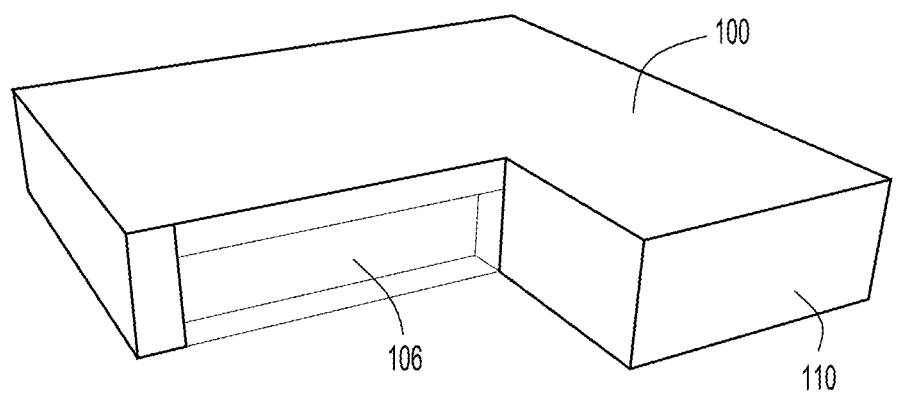

Reference is now made to FIGS. 3A-3D. FIGS. 3A-3D show views of different versions of the lid 100 with a molded frame (e.g., AlSiC or glass coated with Ti/W/Cu/Au—Sn) and an AR coated glass window/optical optically transparent wall 106. The AR coated optically transparent wall 106 may reside inside of a glass wafer lid. In FIGS. 3A and 3C, the optically transparent wall 106 is flush with the adjacent walls of the molded frame 110. In FIG. 3B, the optically transparent wall 106 is completely recessed within the lid 100, and in FIG. 3D, the optically transparent wall is partially recessed within the lid 100.

Figure 4:
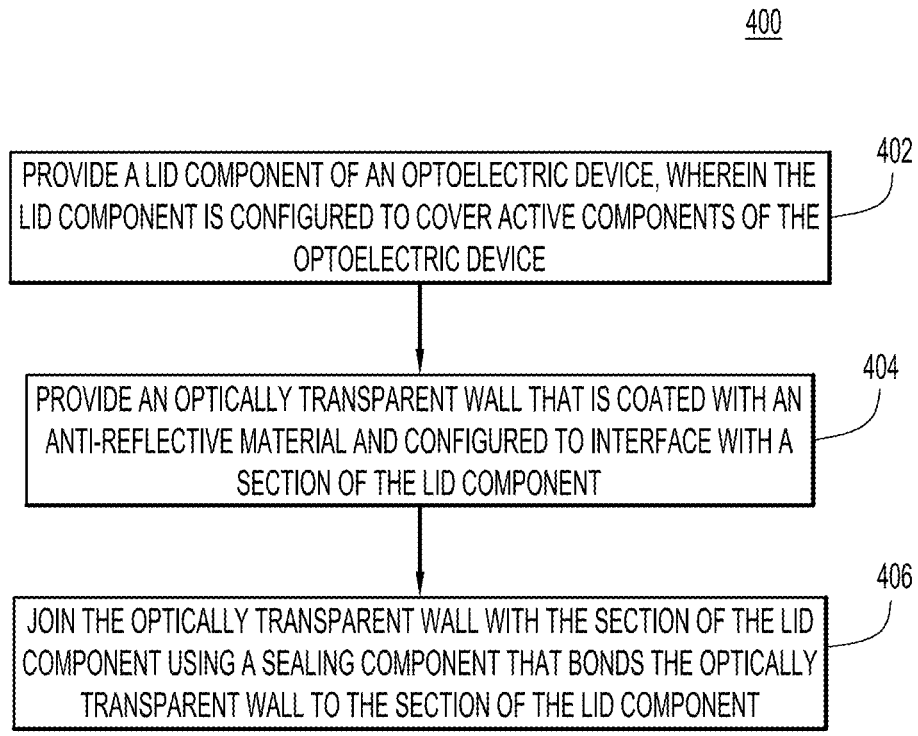
FIG. 4 shows an example flow chart that depicts steps for attaching the lid component to the optically transparent wall.

Reference is now made to FIG. 4. FIG. 4 shows an example flow chart 400 that depicts steps for attaching the lid component to the optically transparent wall. At 402, a lid component for an optoelectronic device is provided. The lid component is configured to cover active components of the optoelectronic device. At 404, an optically transparent wall (e.g., a glass wall) is provided that is coated with an AR material and is configured to interface with a section of the lid component. At 406, the optically transparent wall is joined with the section of the lid component using a sealing component that bonds the optically transparent wall to the section of the lid component. The method depicted in FIG. 4 may be enhanced with any of the additional steps and features referred to above.

Reference is now made to FIGS. 5A and 5B, which show the optically transparent wall 106 as a multiple lens optically transparent wall. One or more lenses 502 may be embedded within the optically transparent wall 106. In one example, the optically transparent wall 106 and the lenses 502 may be made of diffractive material. For example, the entire optically transparent wall 106 may be made of diffractive material. In another variation, the inside of the optically transparent wall 106 may be made of diffractive material while the outside surface of the optically transparent wall 106 may be made of refractive material. The lid 100 and housing material (e.g., frame) may be made out of metal, glass, plastic or filled glass, and the lenses 502 may be bonded to the lid 100 using either an alloy (e.g., An/Sn), an epoxy or an adhesive. The lenses 502 may be bonded, for example, either on the bottom of the lid (with lens dimensions greater than the housing opening) or via side-to-side bonding techniques (with lens dimensions less than or equal to the housing opening).

In summary, a method is provided comprising: providing a lid component of an optoelectronic device, wherein the lid component is configured to cover active components of the optoelectronic device; providing an optically transparent wall that is coated with an anti-reflective material and configured to interface with a section of the lid component; joining the optically transparent wall with the section of the lid component using a sealing component that bonds the optically transparent wall to the section of the lid component. The assembled lid, when mounted onto an interposer on which active optoelectronic components are mounted, provides a seal for the active components of the optoelectronic device.

In addition, a lid is provided comprising: a top surface; a plurality of side surfaces coupled to the top surface; and an optically transparent wall coated with an anti-reflective material adhesively joined to the top surface and one or more of the side surfaces.

The above description is intended by way of example only. Various modifications and structural changes may be made therein without departing from the scope of the concepts described herein and within the scope and range of equivalents of the claims.

What is claimed is:

1. A method comprising:
   providing a lid component of an optoelectronic device, wherein the lid component is configured to cover active components of the optoelectronic device with an opaque top surface and a plurality of opaque side surfaces that are coupled to the top surface at a plurality of edges of the top surface;
   providing an optically transparent side wall that is coated with an anti-reflective material and configured to interface with the top surface of the lid component and one or more opaque side surfaces of the lid component;
   joining the optically transparent side wall with the lid component using a sealing component that bonds the optically transparent wall to the opaque top surface of the lid component and one or more of the plurality of opaque side surfaces of the lid component.

2. The method of claim 1, further comprising forming a frame that holds the optically transparent side wall, the frame having a foot surface with a metallization to allow the foot surface to be bonded on top of a silicon interposer.

3. The method of claim 1, wherein providing the optically transparent side wall comprises providing the optically transparent side wall with the anti-reflective material that is transparent.

4. The method of claim 1, wherein joining the optically transparent side wall comprises joining the optically transparent side wall to the top surface and the one or more side surfaces of the lid component such that the optically transparent wall resides inside of the lid component.

5. The method of claim 1, wherein providing the optically transparent side wall comprises providing plurality of optical lenses in the optically transparent side wall.

6. The method of claim 5, wherein providing the plurality of optical lenses comprises fabricating lenses within the optically transparent side wall with diffractive material.

7. The method of claim 6, wherein providing the plurality of optical lenses comprises fabricating the entire multiple lens optically transparent side wall with diffractive material.

8. The method of claim 1, wherein joining the optically transparent side wall comprises joining the optically transparent side wall to the lid component via a side-to-side bonding technique.

9. A lid for an optoelectronic device comprising:
   a top surface that is optically opaque;
   a plurality of opaque side surfaces coupled to the top surface along a plurality of edges of the top surface; and
   an optically transparent side wall coated with an anti-reflective material adhesively joined to the top surface and one or more of the side surfaces.

10. The lid of claim 9, further comprising at least one of a metallized, plastic, glass and hybrid plastic and metal frame configured to hold the optically transparent side wall.

11. The lid of claim 10, wherein the metallized frame has a foot surface with a metallization to allow the foot surface to be bonded on top of a silicon interposer.

12. The lid of claim 9, wherein the optically transparent side wall comprises the anti-reflective material that is transparent.

13. The lid of claim 9, wherein the optically transparent side wall is recessed within one of the side surfaces.

14. The lid of claim 9, wherein the optically transparent side wall comprises a plurality of lenses.

15. The lid of claim 14, wherein plurality of lenses are formed from diffractive material.

16. The lid of claim 14, wherein the optically transparent side wall is fabricated from diffractive material.

17. The lid of claim 9, wherein the optically transparent side wall is adhesively joined to the top surface and one or more of the side surfaces via a side-to-side bonding technique.

18. A lid for an optoelectronic device comprising:
   a top surface that is optically opaque;
   a plurality of opaque side surfaces coupled to the top surface along a plurality of edges of the top surface;
   an optically transparent side wall adhesively joined to the top surface and one or more of the side surfaces; and
   a frame configured to hold the optically transparent side wall.

19. The lid of claim 18, wherein the frame is formed of any one of a metal material, plastic material, glass material and hybrid plastic and metal material.

20. The lid of claim 18, wherein the frame is formed of a metallized material and has a foot surface with a metallization to allow the foot surface to be bonded on top of a silicon interposer.

* * * * *

UNITED STATES PATENT AND TRADEMARK OFFICE
CERTIFICATE OF CORRECTION

| | | |
|---|---|---|
| PATENT NO. | : 9,151,950 B2 | Page 1 of 1 |
| APPLICATION NO. | : 13/678915 | |
| DATED | : October 6, 2015 | |
| INVENTOR(S) | : Desai et al. | |

It is certified that error appears in the above-identified patent and that said Letters Patent is hereby corrected as shown below:

In the claims

In Col. 4, line 36, insert --a-- after providing.

In Col. 4, lines 42-43, delete "multiple lens".

Signed and Sealed this
Fifth Day of April, 2016

Michelle K. Lee
*Director of the United States Patent and Trademark Office*